United States Patent [19]
Durand et al.

[11] Patent Number: 5,108,978
[45] Date of Patent: Apr. 28, 1992

[54] MULTIFUNCTIONAL CATALYSTS CONTAINING CERIUM, URANIUM AND AT LEAST ONE OTHER METAL, FOR CONVERTING POLLUTANTS EMITTED BY INTERNAL COMBUSTION ENGINES, AND THEIR PREPARATION

[75] Inventors: Daniel Durand, Rueil Malmaison; Gil Mabilon, Saint German En Laye; Philippe Courty, Houilles; Richard Doziere, Beynes, all of France

[73] Assignee: Institut Francais Du Petrole, Rueil Malmaison, France

[21] Appl. No.: 527,778

[22] Filed: May 24, 1990

[30] Foreign Application Priority Data

May 24, 1990 [FR] France ................................ 89 06897

[51] Int. Cl.$^5$ ........................ B01J 23/10; B01J 23/12; B01J 23/40; B01J 23/48
[52] U.S. Cl. .................................. 502/304; 423/213.5
[58] Field of Search ...................... 502/304; 423/213.5

[56] References Cited

U.S. PATENT DOCUMENTS 4,581,344  4/1986  Ledoux et al. ..................... 502/304

FOREIGN PATENT DOCUMENTS 0027069  4/1981  European Pat. Off. ............ 502/304
2665126  12/1985  France .
58-124544  7/1983  Japan ................................. 502/304

Primary Examiner—W. J. Shine
Attorney, Agent, or Firm—Antonelli, Terry, Stout & Kraus

[57] ABSTRACT

The invention concerns a multifunctional catalyst containing cerium, uranium and at least one metal, for converting pollutants emitted by internal combustion engines, and their preparation.

A catalyst comprises a porous layer containing
 from about 20% to about 99% of at least one refractory oxide
 from about 0.8% to about 70% of at least one cerium oxide
 from about 0.1% to about 50% of at least one uranium oxide
 from about 0.1% to about 20% of a metal selected from the group made up of Pt, Rh, Pd, Ru, Ir and Au, and mixtures thereof.

Applications are in the catalytic converter industry.

12 Claims, No Drawings

MULTIFUNCTIONAL CATALYSTS CONTAINING CERIUM, URANIUM AND AT LEAST ONE OTHER METAL, FOR CONVERTING POLLUTANTS EMITTED BY INTERNAL COMBUSTION ENGINES, AND THEIR PREPARATION

The invention concerns a multifunctional catalyst for converting carbon monoxide, hydrocarbons and nitrogen oxides, and a method of making it. It also concerns its use in treating exhaust fumes from motor vehicles, particularly pollutants emitted by internal combustion engines (running on petrol or diesel). These are partly responsible for contaminating the atmosphere, chiefly with carbon monoxide and nitrogen oxides and also with large quantities of unburnt hydrocarbons.

Catalysts are installed in exhaust pipes to limit the content of these various pollutants. They improve combustion of carbon monoxide and hydrocarbons to $CO_2$ and $H_2O$ and reduction of nitrogen oxides to molecular nitrogen, to various degrees.

The catalysts are generally prepared from a ceramic or metal carrier of the monolithic type. A thin layer of one or more refractory oxides, generally alumina, is deposited on it and generally has a far larger surface area and far greater porosity than the carrier. The active metallic phase, essentially comprising metals of the platinum group (Pt, Rh, Pd, Re, Ru, Ir) is dispersed over the oxide.

It is well known in the art that these catalysts, which never work under stabilised operating conditions, are subjected to very great temperature variations (from ambient to over 1000° C.), under severe hydrothermic conditions, and to frequent changes in the composition of the reaction medium (oxidising or reducing atmosphere). This leads to rapid deactivation of the catalyst, caused mainly by simultaneous sintering of the carrier and metals. Several patents claim to limit the sintering, e.g. by adding other oxides such as rare earth oxides, alkali metal or alkaline earth metal oxides, other refractory oxides (zirconia, silica, etc, and even oxides of transition metals (patents FR 2466278; FR 2568143; U.S. Pat. No. 4,678,770, etc.); some of these oxides may have some catalytic action in addition to their stabilising properties (for example $CeO_2$ takes part in the reaction whereby CO is converted to water.)

During the acceleration or deceleration phases of the vehicle, moreover, the catalysts have to work in either a reducing or an oxidising atmosphere. The weight ratio of air to fuel (generally described as the richness) may fluctuate within quite a wide range of frequencies and amplitudes. It is well known in the art that some oxides can change between at least two degrees of oxidation, according to the medium surrounding them: in the case of cerium, for example, the degree of oxidation can easily change from value 3 to value 4, to give oxides $Ce_2O_3$ and $CeO_2$. This property, generally known as the "buffer effect", enables the catalyst to store oxygen when the air/petrol mix is rich in air, and conversely to return the oxygen when the mix is short of air, thus encouraging combustion of carbon monoxide and hydrocarbons.

It is also known to use lanthanides to improve the heat stability and resistance to ageing of post-combustion catalysts (ageing being caused chiefly by sintering of both the porous carrier and the metals). In addition to this property ceric oxide ($CeO_2$) is very often used for its effect in promoting the conversion of CO to water and for its oxygen storing function (buffer effect) (U.S. Pat. No. 4,283,308 and U.S. Pat. No. 4,675,308).

Other oxides are often added to the ceric oxide, either to increase its respiration capacity and/or speed or to limit its sintering (patents U.S. Pat. No. 4,378,307; FR 2568143; EP.A.262.962).

It has also been proposed to deposit each of the metals preferentially on different oxides, e.g. rhodium on a non cerium doped alumina, while platinum and/or palladium may be partly or completely impregnated onto a cerium "doped" alumina. It should be noted that aluminas may also contain other stabilising agents such as alkali metals or alkaline earth metals (Ba, Sr), as well as metals which can promote catalytic activity such as Ni, Co, Fe, Cu and the like (U.S. Pat. No. 4,738,947).

For fuels containing sulphur compounds, it is also proposed to install catalysts in which the porous alumina carrier contains uranium in the exhaust pipe from the engine. The uranium in combination with the metals of the platinum group on the alumina carrier would help to make a very marked improvement in the performance of the catalyst (U.S. Pat. No. 4,323,542).

In a different field, U.S. Pat. No. 3,993,459 describes the use of a catalyst for high temperature conversion of hydrocarbons, comprising cerium oxide, uranium oxide and thorium oxide, combined with lanthanum oxide, cobalt oxide and nickel oxide. However, the catalyst is not active in treating the exhaust fumes from motor vehicles, particularly at very low temperatures, e.g. below 350° C.

Finally, examples of prior art are contained in patents U.S. Pat. No. 4,323,542, FR-A- 2269374, FR-A- 2466278, U.S. Pat. No. 4,675,308 and U.S. Pat. No. 4,221,768.

The object of the invention is to improve the effectiveness factor, particularly the low temperature effectiveness factor, which determines how the catalyst is activated (light-off) when the vehicle starts from cold; also the stability of post-combustion catalysts, and more particularly of those used for large motor vehicles (running on petrol or diesel) which work under severe operating conditions, namely:

high temperatures and high water vapour contents; these conditions generally encourage sintering of the carriers and metals, causing the catalyst to be deactivated;

wide variations in the richness (R) of the air/fuel mix (in amplitude and frequency); this makes it necessary to have an active buffer phase so that a maximum amount of oxygen can rapidly be stored ($R \leq 1$ in oxidising medium) and reliberated ($R \geq 1$ in reducing medium), the oxygen being required to oxidise the carbon monoxide and unburnt hydrocarbons when the air-fuel mix is rich in hydrocarbons ($R \geq 1$).

This condition is most serious with engines which generally operate with the air-fuel mix at a richness of less than 1 (R=0.8 to 1), if they are not fitted with an electronic system to control richness (a lambda probe). So this requires an improvement in the capacity, activity and stability of the buffer phase in addition to the stability of the carrier and dispersion of metals in the catalytically active phase. It has surprisingly been found possible to prepare catalysts with improved use properties, by including the bimetallic couple cerium plus uranium in them, in the forms and proportions described below.

It is known in the art that post combustion catalysts for motor vehicles are prepared:

either by coating a ceramic and/or metallic block with an aqueous suspension essentially containing metallic oxides, possibly precious metals as below, and by drying, thermal activation, possibly depositing precious metals then possibly by drying and thermal activation. The block is then covered with a porous layer, comprising the metallic oxides and the abovementioned metals.

or by impregnating a preformed granular carrier at least once with at least one aquous solution of soluble compounds of the abovementioned metallic elements and/or precious metals, with at least one drying operation and at least one thermal activation.

The preformed carrier may be in the form of spheres or extrusions.

Applicants will hereinafter describe the preparation of catalysts according to the invention in monolithic form, although of course catalysts according to the invention may also be prepared on carriers in the form of spheres or extrusions as mentioned above.

The cerium and uranium are deposited in the form of oxides and/or oxide precursors on the ceramic or metallic carrier of monolithic structure, in honeycomb or other form. The precursors of the two oxides may be introduced either by impregnating at least one constituent (alumina, silica, alumina-silica, zeolite, titanium oxide or the like) of the coating charge, or by addition to the coating suspension in the form of pigments or oxide precursors, or by impregnating the coated block before and/or during and/or after the precious metals are impregnated.

All or part of the active phase (Pt, Rh, Pd, Ru, Ir and possibly Au, Ag, Ni, Co, Fe, Cu, Mn, Cr, Zn or the like) may be included in the preceding stages (either by impregnating a constituent of the coating charge or by including it in the suspension), or all or part may be impregnated onto the coated block then possibly given heat treatment.

The invention thus concerns a multifunctional catalyst for converting carbon monoxide, hydrocarbons and nitrogen oxides, comprising a substrate coated with a porous layer containing a catalytically active phase which comprises at least one metal M selected from the group formed by platinum, rhodium, palladium, ruthenium, iridium, gold, silver and mixtures thereof, characterised in that the porous layer comprises, in percentages by weight relative to the anhydrous product:

from about 20% to about 99% of at least one refractory inorganic oxide,
from about 0.8% to about 70% of at least one cerium oxide,
from about 0.1% to about 50% of at least one uranium oxide and,
from about 0.1% to about 20% of said metal M.

Applicants have found that the addition of uranium oxide and cerium oxide to alumina on a ceramic or metal carrier (generally of the monolithic type with a honeycomb structure) greatly improves the activity and stability (synergic effect) of the post combustion catalyst, as compared with a catalyst containing only one of these two metals (Ce or U). The improvement is all the more important, in that:

the catalyst works with gases resulting from combustion of an air/fuel mix, where there are wide variations in richness from the value 1, with high periods.

a catalyst usually operates in a slightly oxidising medium (with an engine operating at a richness of about 0.8 to 1 and not fitted with an electronic probe to control the richness).

The porous layer advantageously comprises the following, in percentages by weight relative to the anhydrous product:

from about 30% to about 95% of at least one refractory inorganic oxide,
from about 4.3% to about 50% of at least one cerium oxide,
from about 0.5% to about 30% of at least one uranium oxide and
at least one precious metal selected from the group formed by (Pt, Rh, Pd, Ru, Ir, Au and Ag), which advantageously represents about 0.2% to about 8%, and preferably about 0.5% to about 5% by weight relative to the porous layer.

The values given below are expressed as percentages by weight relative to the weight of the porous layer, after calcination in air at 800° C. for four hours.

The weight of the porous layer generally corresponds to a quantity of from 20 g to 200 g of material per liter of substrate, and advantageously from 50 g to 150 g per liter of substrate.

The preferred content of cerium oxide (from 10 to 40%), uranium oxide (from 2 to 20%) and precious metal (from 0.5 to 40%) has been found to give excellent results in terms of stable performance and activity in oxidising and reducing the various pollutants, for preferred weights of porous layer ranging from 70 to 130 g per liter of substrate.

A secondary feature of the process is that at least one oxide of at least one auxiliary metal may be included in the porous layer, replacing part of the alumina (either directly in the form of oxide pigment, or in the form of oxide precursor compounds), in a proportion ranging from 0 to 50% and preferably from 0 to 30% by weight relative to the porous layer, which is regarded as anhydrous.

An auxiliary metal oxide refers to:
either substituents of alumina: amorphous silica or alumina-silica, alumina silicas of the zeolite type, titanium oxide,
or promoters of activity and stability in the active metal phase: oxides of Cr, Fe, Ni, Co, Cu, etc.
or a combination of two or more of these compounds.

It is possible for all or part of the active phase, generally made up of metals of the platinum group (Pt, Rh, Pd, Ru, Ir) and Re, Au and Ag, to be deposited on one or more oxides forming the porous layer prior to coating.

The refractory inorganic oxide is generally selected from the group formed by at least one of the following compounds: alpha alumina, beta alumina, gamma alumina, delta alumina, kappa alumina, chi alumina, theta alumina, silica, alumina-silica, zeolites, titanium oxide and combinations thereof, composite oxides or a solid solution containing at least two of the above oxides. It is preferable to use aluminas which have both a fairly large specific surface area and acceptable heat stability.

The invention also concerns the preparation of a multifunctional catalyst. This comprises the following stages:

a) preparing a mixture of at least one refractory inorganic oxide and/or at least one of its precursors, at least one uranium oxide and/or one of its precursors, at least one cerium oxide or one of its precursors and a salt of at least one active phase metal, advantageously deposited on at least one of these oxides, b) suspending the mixture, preferably in a solution with a pH from about 2 to about 9, c) coating the substrate with the suspension so as to obtain the precursor of the porous layer, d) drying and carrying out heat treatment at a temperature below 1000° C.

In another method of preparation the catalyst according to the invention may be obtained as follows:

a) by preparing a mixture of at least one refractory inorganic oxide and/or at least one of its precursors, at least one uranium oxide or one of its precursors, at least one cerium oxide or one of its precursors, and possibly a salt of at least one active phase metal, advantageously deposited on at least one of these oxides, b) suspending the mixture, preferably in a solution with a pH from about 2 to about 9, c) coating the substrate with the suspension so as to obtain the porous layer, d) drying it and carrying out heat treatment at a temperature below 1000° C., e) carrying out the following two successive stages at least once:

impregnating onto the porous layer the remainder of the precursors of said cerium and uranium oxides and/or either the salt of the active phase metal or the remainder of the salt, if part of it was included at the coating stage.

drying it and carrying out heat treatment at a temperature below 1000° C.

In another method of preparation the catalyst according to the invention may be obtained as follows:

a) by impregnating at least part of at least one refractory inorganic oxide with at least part of at least one of the salts which are precursors of the cerium and/or uranium oxides and/or of the active phase metal M, advantageously deposited on at least one of these oxides, b) drying it and carrying out heat treatment at a temperature below 1000° C., c) putting the inorganic oxide, impregnated with the various precursors defined above, into suspension, preferably in a solution with a pH from about 2 to about 9, possibly with at least part of at least one cerium oxide, possibly of at least one uranium oxide and possibly with at least part of at least one salt of an active phase metal M, d) coating the substrate with the suspension to obtain the porous layer, e) drying it and carrying out heat treatment at a temperature below 1000° C., f) carrying out the following two successive stages at least once:

impregnating onto the porous layer the remainder of the salts which are precursors of said cerium and uranium oxides and/or either the salt of the active phase metal or the remainder of that salt if part of it was included at the coating stage.

drying it and carrying out heat treatment at a temperature below 1000° C.

A secondary feature of the preparation method is that the mixture obtained may be dispersed in an alumina with a large specific surface area, which can easily be peptised. An alumina of this type is known as soft alumina, and its crystallographic structure (boemite or pseudo-boemite) is different from that of the charge alumina.

The catalysts according to the invention may be prepared from preformed carriers comprising spheres, pellets or extrusions from 1 to 10 mm in diameter and/or length. However, it is often preferable to use a rigid carrier of the monolithic type made of ceramic, metal or other materials such as carbides, nitrides and the like, of a cellular, e.g. honeycomb structure; these carriers have the advantages of being less liable to deterioration through mechanical attrition and of producing less pressure drop when the fumes are discharged.

These blocks may be made of:

either ceramics: in which case they are at least partly made of crystallised materials such as alumina, sillimanite, magnesium silicate, zirconia, petalite, spodumene, cordierite, aluminosilicates, mullite or a combination of a plurality of these compounds.

or silicon carbide and/or nitride, or aluminium titanate, or metal, generally obtained from iron, chromium and aluminium alloy which may be doped with nickel, cobalt, cerium or yttrium; the best known being FECRALLOY or KANTHAL. The metal in the substrate may also be a carbon steel.

The metal substrates containing a few percent of aluminium may advantageously be treated by heating them in what may be a more or less oxidising atmosphere, at high temperatures (800° to 1200° C.) for variable lengths of time. This enables a surface layer of alumina to develop from the aluminium contained in the alloy. This layer, which has a large surface area and greater porosity than the original metal, thus encourages bonding of the deposit of refractory oxides with a larger surface area, which form the porous layer described above.

The carriers are then generally covered by depositing a thin layer of oxides forming said porous layer; a formulation of the layer by weight has been given above in terms of dry materials. The deposit may be formed either by steeping the carrier in a suspension, or by putting it under partial vacuum, or—particularly in the case of metal blocks—by spraying a suspension of these oxides (or precursors) on the metal sheet (at low or high temperature and at atmospheric pressure or under vacuum) before or after the sheet is put into monolithic form. The thickness of the layer may be from a few microns to several tens of microns. The initial specific surface area of the porous layer deposited is generally from about 20 $m^2/g$ to about 300 $m^2/g$ and preferably from about 50 $m^2/g$ to about 200 $m^2/g$, to encourage initial dispersion of the metals.

The coating suspensions, which are generally rich in alumina, may be prepared from:

either a mixture of two aluminas of different structures in accordance with patent EP 73703: one being a peptisable pseudo-boemite generally known as a soft alumina, and the other possibly being a gamma, delta, theta or alpha alumina described as a charge alumina.

or one type of alumina: boemite (CONDEA's alumina going by the name of PURAL) or gamma alumina (e.g. KAISER's VERSAL GH).

or one or other of these preparations with either an alumina sol or an aluminium salt added to it.

In accordance with the invention the simultaneous or separate addition of the cerium and uranium oxides or their precursors may be carried out at various stages in the preparation of the catalysts. They may be introduced in the form of solid pigment (oxides, hydroxides, carbonates, hydroxy-carbonates or insoluble salts) and/or precursors which are soluble in the coating suspension, and/or preimpregnated onto one of the constituents of the coating charge, and/or deposited on the porous layer before the metals are impregnated, and/or coimpregnated with the metals.

The auxiliary oxides defined above may be added to the suspension of alumina(s) and possibly cerium and uranium oxides (or oxide precursors).

Pore forming products (sawdust, vegetable gums, starch, alkyl celluloses, carbonates, xanthanes) may be added to the coating suspension to increase the porosity of the porous layer. These materials will decompose during the heat treatment and generally create macroporosity.

After the coating stage the block is generally dried, then heat treated to decompose the metal salts to their oxides. According to the operating conditions for the treatment (temperature, duration, type of atmosphere and the like) the properties of the porous layer (crystallographic structure, specific surface area, porosity and the like) can be adjusted to give a favourable state with good dispersion of the metals but also good resistance to sintering.

Catalytic activity is essentially provided by precious metals, chiefly Pt, Pd and Rh but also Ru, Ir, Re, Au and Ag (and possibly other less noble metals such as Ni, Co, Cu, Fe and the like). They may be included either with the charge alumina (U.S. Pat. No. 4,675,308) or by impregnation onto the coated block.

It is known in the art that various impregnating methods may be used:
- dry impregnation, using a solution of the desired metal precursor or precursors in a volume no greater than the pore volume of the carrier when it has been coated then thermally activated.
- exchange impregnation, using a solution of the metal salts in a volume much greater than the pore volume of said coated carrier. Impregnation may be static or dynamic, under atmospheric pressure or under vacuum, and with competing or non-competing ions.

After the impregnating stage the block, which may have been drained, is dried then heat treated in an oxidising medium (air which may have been diluted with large or small quantities of nitrogen), or a neutral medium (in nitrogen), or a reducing medium (hydrogen and/or carbon monoxide diluted with a neutral gas, or in a combustion gas). The temperatures for the treatment may be from 450° to 900° C., although temperatures of the order of 450° to 700° C. are preferable.

Various methods of preparing catalysts are given in the following examples, to illustrate the invention:
- mixing a charge alumina ($\gamma$ alumina) with a soft alumina (boemite) (by the methods described in patent EP 73703); in some examples the charge alumina is previously preimpregnated with oxide precursor salts (cerium and/or uranium and/or iron) and/or of precious metals. The weight ratio of charge alumina to soft alumina is 5.33.
- preparing the suspension by pouring the powder mix into a dilute nitric acid solution so that the soft alumina is partly or completely peptised. The pH of the suspension is adjusted to 5.
- steeping the block in the suspension, then draining and blowing air onto it.
- drying and heat treating the coated block, in air at from 25° to 700° C.
- possibly adding uranium and/or cerium oxides. This is done by dry impregnation of a nitric solution of cerous nitrate and/or uranyl nitrate, onto the coated and calcined block. After this impregnation the material is dried again and calcined by the methods described above.
- impregnating precious metal precursors (preferably $H_2PtCl_6$ and $RhCl_3$) onto the coated block, by the so-called dry method. A volume of solution equal to the pore volume of the coated block is prepared by dissolving the desired quantities of metal salts in water. The coated block is impregnated with the metal solution, dried at 200° C. and finally calcined at 600° C. in air for 3 hours.

The method of preparing the catalysts of the invention is described in the examples below.

They generally comprise:
a ceramic or metal block,
a porous layer (aluminas and cerium and uranium oxides) of about 110 g for a substrate (block) volume of 1 liter,
an active metal phase in the form of platinum and/or rhodium and/or palladium in a Pt/Rh weight ratio of 8, their weight being precisely 1.765 g per liter of substrate.

Examples 2, 3 and 10, 11, 12 are comparative ones, showing the scope of the invention.

The catalysts of the invention bring improved performance in the following fields:
multifunctional catalysis with closed cycle control of the richness of the fuel/air mix*, the richness R being set to $R = 1 \pm 0.01$.
multifunctional catalysis without richness control, the richness R fluctuating between about 0.75 and about 1.20 round a mean value of from 0.85 to 0.95.
oxidation catalysis without richness control, the richness R fluctuating between about 0.5 and about 1.2 around a mean value of 0.6 to 0.9; (values below 0.80 are generally found in diesel engines ($R = 0.5$–0.6) and engines with poor mixes ($R = 0.65$–0.75)).

* "régulation de richesse bouclée".

EXAMPLE 1 (INVENTION)

150 g of soft alumina (boemite) in powder form is dispersed in 2000 cm$^3$ of distilled water and 800 g of charge alumina (gamma alumina) with a specific area of 110 m$^2$/g; these two types of alumina are prepared by the methods described in patent EP 73703.

A 0.904 liter ceramic block, sold by CORNING and with a honeycomb structure containing 62 cells per cm$^2$, is dipped into the suspension after the pH of the suspension has been adjusted to 5 by adding nitric acid. The block is drained and air is blown at it (to remove excess suspension from the channels). It is dried then calcined at 700° C.; the weight of the porous layer deposited is 80 g.

The substrate is then impregnated with 180 cm$^3$ of an aqueous solution of cerous nitrate and uranyl nitrate containing the equivalent of 15 g of ceric oxide ($CeO_2$) and 5 g of uranium oxide ($U_3O_8$). It is then dried and recalcined at 650°.

The carrier is reimpregnated with 170 cm$^3$ of an aqueous solution, prepared by adding a solution of hexachloroplatinic acid ($H_2PtCl_6$) containing 25% by weight of platinum, and hydrated rhodium trichloride (RhCl3) to water; the quantities of metal deposited are, for Rh and Pt respectively, 0.1773 g and 1.4183 g. After 30 minutes' contact the block is dried, then calcined at 600° C. for three hours.

The weight percentages of the various components of the porous layer, including precious metals, are as follows:

Al2O3: 78.743%
CeO2: 14.765%
U3O8: 4.922%
Pt: 1.396%
Rh: 0.174%

EXAMPLE 2 (COMPARATIVE)

The catalyst described in example 1 is reproduced exactly, except that it contains only cerium oxide: the quantity deposited on the porous layer is 20 g.

The weight percentages of the various components of the porous layer, including precious metals, are as follows:

Al2O3: 78.744%
CeO2: 19.686%
U3O8: 0.000%
Pt: 1.396%
Rh: 0.174%

EXAMPLE 3 (COMPARATIVE)

The various coating and impregnating operations are carried out in the same way and with the same quantities of materials as in example 2, except that the porous layer (80 g) is impregnated with uranyl nitrate instead of cerium nitrate: (equivalent to 20 g of uranium oxide U3O8).

The weight percentages of the various components of the porous layer, including precious metals, are as follows:

Al2O3: 78.744%
CeO2: 0.000%
U3O8: 19.686%
Pt: 1.396%
Rh: 0.174%

EXAMPLE 4 (INVENTION)

1000 g of (gamma) alumina spheres with a surface area of 120 m$^2$/g is impregnated with 1150 cm$^3$ of a cerium nitrate solution containing the equivalent of 230.8 g of cerium oxide (CeO2). This doped alumina is dried, calcined at 650° C. for 3 hours and ground to a mean particle size of a few microns.

150 g of alumina binder in powder form is dispersed in 2000 cm$^3$ of distilled water and 800 g of this cerium doped charge alumina.

A 0.904 liter ceramic block is dipped into the suspension when the pH of the suspension has been adjusted to 5 by adding nitric acid. The block is drained and air is blown into it. It is dried, then calcined at 650° C. The weight of the porous layer deposited is 95 g.

The block is impregnated with 170 cm$^3$ of an aqueous uranyl nitrate solution containing the equivalent of 5 g of uranium oxide. It is then dried and recalcined at 650° C.

The carrier is impregnated as above with the 160 cm$^3$ of the aqueous solution containing the metal precursors; the quantities of metals deposited are still 0.1773 g of Rh and 1.4183 g of Pt. After 30 minutes of contact the block is dried, then calcined at 600° C. for three hours.

The weight percentages of the various components of the porous layer, including precious metals, are as follows:

Al2O3: 78.750%
CeO2: 14.760%
U3O8: 4.920%
Pt: 1.396%
Rh: 0.174%

EXAMPLE 5 (INVENTION)

The catalyst is prepared as in example 4 except that:
the 1000 g. of (gamma) alumina spheres with a surface area of 120 m$^2$/g. is impregnated with 1150 cm$^3$ of a uranyl nitrate solution containing the equivalent of 76 g. of uranium oxide (U3O8).
and the block covered with 85 g. of porous layer is then impregnated with 170 cm$^3$ of an aqueous cerous nitrate solution containing the equivalent of 15 g. of ceric oxide (CeO2). When the substrate has been dried and calcined it is reimpregnated with the precious metal solution under the same conditions as above.

The weight percentages of the various components of the porous layer, including precious metals, are as follows:

Al2O3: 78.700%
CeO2: 14.760%
U3O8: 4.970%
Pt: 1.396%
Rh: 0.174%

EXAMPLE 6 (INVENTION)

In this example the cerium and uranium are previous impregnated onto the charge alumina:
1000 g. of (gamma) alumina spheres is impregnated with 1150 cm$^3$ of a solution of uranyl nitrate and cerium nitrate containing the equivalent of 78.4 g. of uranium oxide (U3O8) and 235.2 g. of cerium oxide. This doped alumina is dried, calcined at 650° C. for three hours and ground to a mean particle size of a few microns.

150 g. of alumina binder in powder form is dispersed in 2000 cm$^3$ of distilled water and 800 g. of this uranium-cerium doped charge alumina.

When a 0.904 liter ceramic block has been coated under the operating conditions defined above, then dried and calcined at 650° C. (the weight of the coating layer is 99.5 g.), the carrier is impregnated with 160 cm$^3$ of an aqueous soltuion containing the chlorine precursors of rhodium and platinum. When the catalyst has been dried and calcined at 600° C. it contains 0.1773 g. of Rh, 1.4183 g. of Pt, 5 g. of U3O8 and 15 g. of CeO2.

The weight percentages of the various components of the porous layer, including precious metals, are as follows:

Al2O3: 78.632%
CeO2: 14.840%
U3O8: 4.950%
Pt: 1.403%
Rh: 0.175%

EXAMPLE 7 (INVENTION)

A 0.904 liter block is dipped into an acidified suspension containing 150 g. of alumina binder and 800 g. of charge alumina.

When it has been drained, dried and calcined at 700° C., the coated carrier (80 g. of alumina) is impregnated with 170 cm$^3$ of an aqueous solution prepared by adding a hexachloroplatinic acid solution, containing 25% by weight of platinum, rhodium trichloride and cerium and uranyl nitrates to water; the quantities of metals deposited are respectively 0.1773 g. and 1.4183 g. for Rh and Pt, and the equivalent of 15 g. of CeO2 and 5 g. of U3O8 for Ce and U.

After 30 minutes' contact the block is dried, then calcined at 600° C. for three hours.

The weight percentages of the various components of the porous layer, including precious metals, are as follows:
Al2O3: 78.750%
CeO2: 14.760%
U3O8: 4.920%
Pt: 1.396%
Rh: 0.174%

EXAMPLE 8 (INVENTION)

For this experiment we used a metal block produced by the German company BEHR. The characteristics of the carrier are as follows:
diameter = 124 mm
height = 74.5 mm giving a volume of 0.899 liter
wall thickness = 40 microns
number of cells = 62/cm$^2$ After oxidising treatment to encourage a thin film of alumina to form on the surface, to aid in the bonding of the porous layer, the block is dipped into a suspension, which is of the same composition as that in example 6 except that the volume of water used is doubled; the change in this parameter makes it necessary to repeat the coating operation several times.

The coated metal carrier (99 g of porous layer) is dried, calcined at 650° C. and impregnated with 145 cm$^3$ of a solution of rhodium chloride and hexachloroplatinic acid. After calcination at 600° C. the catalyst contains 1.4183 g of Pt and 0.1773 g of Rh.

The weight percentages of the various components of the porous layer, including precious metals, are as follows:
Al2O3: 78.764%
CeO2: 14.800%
U3O8: 4.940%
Pt: 1.410%
Rh: 0.176%

EXAMPLE 9 (INVENTION)

The preparation method is the same as that described in example 6, except that iron nitrate (equivalent to 78.4 g of Fe2O3) is added to the solution of cerium and uranyl nitrates. The weight ratio of cerium oxide to iron oxide is 3.

The weight percentages of the various components of the porous layer, including precious metals, are as follows:
Al2O3: 73.826%
CeO2: 14.764%
U3O8: 4.920%
Fe2O3: 4.920%
Pt: 1.396%
Rh: 0.174%

EXAMPLE 10 (COMPARATIVE)

The preparation method is the same as that described in example 9, except that the solution for impregnating the charge alumina only contains cerium and iron nitrates (no uranyl nitrate). The weight ratio of cerium oxide to iron oxide is still 3.

The weight percentages of the various components of the porous layer, including precious metals, are as follows:
Al2O3: 78.744%
CeO2: 14.764%
U3O8: 0.000%
Fe2O3: 4.922%
Pt: 1.396%
Rh: 0.174%

EXAMPLE 11 (COMPARATIVE)

A 0.904 liter ceramic block is coated with a suspension of aluminas by the method described in example 1. After drying and calcination the porous layer (90 g) is impregnated with a solution containing cobalt, nickel, lanthanum, cerium, thorium and uranyl nitrates: the oxide equivalents of each of the salts dissolved are respectively: 2.5 g, 0.3 g, 6.5 g, 1.5 g, 1.2 g and 0.2 g. It should be noted that the catalyst does not contain any precious metals.

After drying and calcination for two hours at 800° C., the composition of the impregnated porous layer by weight is as follows:
Al2O3: 88.063%
La2O3: 6.360%
CoO: 2.446%
NiO: 0.293%
U3O8: 0.196%
CeO2: 1.468%
ThO2: 1.174%
Pt: 0.000%
Rh: 0.000%

EXAMPLE 12 (COMPARATIVE)

A block is coated under the same conditions as in example 11, then impregnated with the same solution of the various nitrates. After calcination at 800° C., the block is reimpregnated as in example 1, with a solution of chlorine precursors of precious metals.

The composition of the porous layer after calcination at 600° C. for three hours is as follows:
Al2O3: 86.709%
La2O3: 6.262%
CoO: 2.408%
NiO: 0.289%
U3O8: 0.193%
CeO2: 1.445%
ThO2: 1.156%
and
Pt: 1.366%
Rh: 0.171%

EXAMPLE 13 (invention)

A catalyst is prepared by the method in example 1, except that the quantities of cerium oxide and uranium oxide are different and that it only contains one active metal, namely platinum.

The weight percentages of the various components of the porous layer, including precious metals, are as follows:
Al2O3: 86.624%
CeO2: 9.456%
U3O8: 2.350%
Pt: 1.570%
Rh: 0.000%

EXAMPLE 14 (invention)

A catalyst is prepared by the method of example 1, except that the quantities of cerium oxide and uranium oxide are different and that the active metals are palladium and rhodium.

The weight percentages of the various components of the porous layer, including precious metals, are as follows:
Al2O3: 60.428%
CeO2: 28.250%
U3O8: 10.380%
Pt: 0.754%
Rh: 0.188%

EXAMPLE 15 (invention)

A catalyst is prepared by the method of example 1, except that the quantities of cerium oxide and uranium oxide are different and that the active metals are platinum, palladium and rhodium.

The weight percentages of the various components of the porous layer, including precious metals, are as follows:
Al2O3: 77.730%
CeO2: 8.350%
U3O8: 12.350%
Pt: 0.931%
Rh: 0.174%
Pd: 0.465%

EXAMPLE 16 (engine test bench test)

All the catalysts thus prepared are mounted on systems (engine test benches) which can test their activity in the new and aged state; accelerated ageing is carried out.

The ageing procedure for the catalysts is as follows:
1 minute at 50 km/h
increased to 150 km/h, where it continues for 1 minute
decreased to 50 km/h and injection of air for 20 seconds
recommencement of the cycle.

The duration of the ageing stage is 200 hours and the temperatures reached are about 880° C. The catalysts are mounted on the exhaust pipe of an engine with a cubic capacity of 1.8 liters (Renault 21). It has a carburettor (so there is no electronic control of the richness of the air/fuel mix) and the engine is tuned so that the mean richness of the air/fuel mix is 0.90.

The performance of each catalyst is assessed before and after ageing on a different engine test bench (with an engine of the same cubic capacity). This time the engine has a system to control the richness of the mix, which can operate with a pulsating action with variations in the air/fuel ratio in amplitude and frequency. A (radiator) system controls the temperature of the exhaust fumes before they pass over the catalyst.

a) The conditions for the first activity measuring test are as follows:

The effectiveness factor for each catalyst is determined, for a given temperature and space velocity (VVH), by varying the richness of the air/fuel mix between two values.
temperature: 450° C. (inlet to catalyst)
space velocity: 50000 h-1
richness: 0.95 to 1.05.

The effectiveness factor of the catalyst relative to a reagent is calculated from the equation $$E(CO)\% = 100 \times \int_{R=0.95}^{R=1.05} (\% \text{ CO conversion})$$

The effectiveness factors determined relative to the chief reagents, with the various catalysts in the new or aged state, are set out in the table below:

BLOCK (race track: RT3" type) - porous layer (about 110 g/litre)
Precious metals: generally
Pt/Rh = 8    (Pt + Rh = 1.765 g/litre of substrate)
(weight ratio)  i.e. about 1.6 weight % relative to porous layer
Except for examples: 11 (no M), 13 (only Pt),
14 (Pd + Rh = 1.042 g/l)
15 (Pt + Rh + Pd)

| Catalysts | weight % | | EFFECTIVENESS FACTOR % (0.95 ≦ RICHNESS ≦ 1.05) | | | | | |
|---|---|---|---|---|---|---|---|---|
| | | | NEW | | | AGED | | |
| (example No.) | U3O8 | CeO2 | CO | NOx | HC | CO | NOx | HC |
| 1 (Ce + U)M* | 4.92 | 14.76 | 83 | 62 | 84 | 78 | 57 | 81 |
| 2 (Ce/M) | 0 | 19.69 | 84 | 63 | 82 | 73 | 54 | 75 |
| 3 (U/M) | 19.69 | 0 | 75 | 58 | 78 | 64 | 50 | 70 |
| 4 (Ce/S—U/M)** | 4.92 | 14.76 | 83 | 63 | 82 | 77 | 57 | 79 |
| 5 (U/S—Ce/M) | 4.97 | 14.76 | 82 | 58 | 83 | 77 | 54 | 80 |
| 6 (U + Ce/S) | 4.95 | 14.84 | 86 | 68 | 87 | 80 | 63 | 83 |
| 7 (U + Ce + Mts/S) | 4.92 | 14.76 | 81 | 59 | 80 | 76 | 56 | 77 |
| 8 (metallic M) | 4.84 | 14.80 | 84 | 66 | 86 | 79 | 61 | 83 |
| 9 (Fe, Ce, U) | 4.92 (Fe2O3 = 4.92%) | 14.76 | 87 | 67 | 87 | 81 | 64 | 84 |
| 10 (Fe.Ce) | 0 (Fe2O3 = 4.92%) | 14.76 | 86 | 66 | 87 | 76 | 56 | 76 |

-continued

| | | | | | | | | |
|---|---|---|---|---|---|---|---|---|
| 11 (+Th+ etc) | 0.20 | 1.47 (others = 9.74%) (no Pt, Rh) | 21 | 9 | 17 | 14 | 4 | 11 |
| 12 (+Th+ etc +Pt, Rh) | 0.19 | 1.45 (others = 10.27%) | 63 | 57 | 71 | 47 | 40 | 56 |
| 13 (Pt) | 2.35 | 9.46 | 80 | 55 | 87 | 74 | 50 | 82 |
| 14 (Pd—Rh) | 10.38 | 28.25 | 82 | 61 | 75 | 79 | 58 | 71 |
| 15 (Pt—Pd—Rh) | 12.35 | 8.35 | 81 | 63 | 81 | 77 | 58 | 77 |

*M = coated monolithic block
**S = charge alumina

With new catalysts the effectiveness factor as a function of the variations in richness is generally found to be substantially equivalent for catalysts containing precious metals.

On the other hand, accelerated ageing of the catalysts for 200 hours produces a greater decrease in the effectiveness factor of catalysts which do not contain cerium and uranium oxides simultaneously: for carbon monoxide, for example, there is a loss of effectiveness of 4 to 6 points instead of 10 or so points with catalysts containing one of these two oxides.

Moreover, catalysts with a relatively small content of cerium and uranium oxides, which contain thorium oxide, are relatively inactive, particularly if they do not contain any precious metals. Their performance in the ageing stage also seems less stable than that of the catalysts according to the invention.

b) The operating conditions for the second activity measuring test with a pulsating action are as follows:

The effectiveness factor for each catalyst, for a given temperature and space velocity (VVH), is determined by varying the richness (R) of the air/fuel mix with variable frequencies; the values of R are symmetrical relative to the richness 1.

Operating conditions are as follows:
temperature: 450° C. (inlet to catalyst)
space velocity: 50000 h-1
richness: $1 \pm 0.1$
amplitude of richness: $\pm 0.1$
frequency of variations in richness: from 0.25 to 10 Hz.

The effectiveness factor of the catalyst relative to a reagent is calculated from the equation $$E(CO) \% = 100 \times \int_{P = 0.10}^{P = 4.0} (\% \text{ CO conversion})$$

$$(P = \text{period(s)} = 1/\text{frequency})$$

The effectiveness factor values, determined relative to the chief reagents, with the various catalysts of the formulations defined above, in the new or aged state, are set out in the table below:

BLOCK (race track: RT3" type) - porous layer (about 110 g/litre)
Precious metals: generally
Pt/Rh = 8        (Pt + Rh = 1.765 g/litre of substrate)
(weight ratio)  i.e. about 1.6 weight % relative to porous layer
Except for examples: 11 (no M), 13 (only Pt),
14 (Pd + Rh = 1.042 g/l),
15 (Pt + Rh + Pd)

| Catalysts (example No.) | weight % | | EFFECTIVENESS FACTOR % ($0.1 \leq$ PERIOD $\leq 4.0$) | | | | | |
|---|---|---|---|---|---|---|---|---|
| | | | NEW | | | AGED | | |
| | U308 | CeO2 | CO | NOx | HC | CO | NOx | HC |
| 1 (Ce + U)/M | 4.92 | 14.76 | 74 | 67 | 86 | 61 | 55 | 78 |
| 2 (Ce/M) | 0 | 19.69 | 71 | 64 | 81 | 53 | 48 | 69 |
| 3 (U/M) | 19.69 | 0 | 65 | 59 | 79 | 46 | 44 | 67 |
| 4 (Ce/S—U/M) | 4.92 | 14.76 | 72 | 66 | 85 | 59 | 54 | 75 |
| 5 (U/S—Ce/M) | 4.97 | 14.76 | 71 | 62 | 85 | 58 | 54 | 74 |
| 6 (U + Ce/S) | 4.95 | 14.84 | 77 | 70 | 88 | 66 | 61 | 79 |
| 7 (U + Ce + Mts/S) | 4.92 | 14.76 | 72 | 63 | 84 | 59 | 52 | 73 |
| 8 (metallic M) | 4.94 | 14.80 | 73 | 67 | 85 | 61 | 56 | 76 |
| 9 (with Fe) | 4.92 (Fe2O3 = 4.92%) | 14.76 | 78 | 71 | 87 | 67 | 62 | 77 |
| 10 (Fe—Ce) | 0 (Fe2O3 = 4.92%) | 14.76 | 74 | 72 | 86 | 54 | 51 | 71 |
| 11 (+Th+ etc) | 0.20 (others = 10.27%) (no precious Mts) | 1.468 | 15 | 3 | 8 | 7 | 2 | 5 |
| 12 | 1.445 | 0.19 | 43 | 38 | 61 | 32 | 21 | 44 |

| | -continued | | | | | | | |
|---|---|---|---|---|---|---|---|---|
| (+Th+ etc +Pt. Rh) | (others = 10.15%) | | | | | | | |
| 13 (Pt) | 2.35 | 9.46 | 70 | 64 | 88 | 59 | 53 | 81 |
| 14 (Pd—Rh) | 10.38 | 28.25 | 71 | 68 | 79 | 64 | 52 | 73 |
| 15 (Pt—Pd—Rh) | 12.35 | 8.35 | 76 | 67 | 83 | 63 | 56 | 75 |

With new catalysts the effectiveness factor, calculated as a function of the reciprocal of the richness pulsation frequencies, is substantially equivalent for catalysts containing cerium and possibly uranium, but far lower for the catalyst only containing uranium. After ageing, and particularly with CO and hydrocarbon reagents, catalysts containing the two oxides ($CeO_2$ and $U_3O_8$) remain more effective than catalysts containing only one of the two oxides; (for CO there is a 13 point loss of effectiveness with the two oxides combined and a 19 point loss when they are separate).

These results demonstrate the synergic effect on the resistance of the catalysts to ageing, produced by a combination of the two oxides, as compared with catalysts containing an equivalent weight percent of one or other of the oxides. The most effective method of preparing the catalyst similarly seems to be the one in which the alumina charge used for preparing the coating suspension is preimpregnated with precursors of both oxides.

As in the above test, catalysts which contain only small quantities of cerium and uranium but which contain thorium are less active in converting CO, NOx and HC if they do not contain any precious metals.

Moreover, catalysts of the same formulation, but prepared on either a ceramic or a metal carrier, have substantially the same performance.

EXAMPLE 17

In this experiment the catalysts prepared in examples 1, 2 and 3 are tested and aged under the conditions defined in example 12, except that ageing is carried out with an engine fitted with a lambda probe, which sets the richness of the air/fuel mix to a value of 1.

The effectiveness factors measured on the new and aged catalysts, as a function either of richness or the period of richness variations, are summarised in the table below.

Compared with the results above, operation at richness=1 without any great fluctuation in that richness can be seen to reduce the loss of effectiveness for the three catalysts, particularly the catalysts containing cerium. However, the catalyst containing both oxides is still the most effective in converting the various pollutants.

All these results thus demonstrate the synergic effect—due to the simultaneous addition of cerium and uranium oxides—on the improvement of the effectiveness of the catalyst, when it is operating more particularly with fairly wide variations in richness, in amplitude and frequency.

We claim:

1. A multifunctional catalyst for converting carbon monoxide, hydrocarbons and nitrogen oxides, comprising a substrate coated with a porous layer which consists essentially of at least one catalytically active phase formed by at least one metal M selected from the group consisting of platinum, rhodium, palladium, ruthenium, iridium, gold and silver, and mixtures thereof, characterized in that the porous layer consists essentially of, as a weight percentage relative to the anhydrous product:
   from about 20% to about 99% of at least one refractory oxide,
   from about 0.8% to about 70% of at least one cerium oxide,
   from about 0.1% to about 50% of at least one uranium oxide, and
   from about 0.1% to about 20% of said at least one metal M.

2. The catalyst of claim 1, wherein the porous layer consists essentially of, as a weight percent relative to the anhydrous product:
   from about 30% to about 95% of the at least one refractory oxide,
   from about 4.3% to about 50% of the at least one cerium oxide,

| Catalysts (Example No.) | % by weight | | % EFFECTIVENSS (0.95 ≦ RICHNESS ≦ 1.05) | | | | | |
|---|---|---|---|---|---|---|---|---|
| | | | NEW | | | AGED | | |
| | $U_3O_8$ | $CeO_2$ | CO | NOx | HC | CO | NOx | HC |
| 1 (Ce + U) | 4.92 | 14.76 | 83 | 62 | 84 | 80 | 59 | 82 |
| 2 (Ce/M) | 0 | 19.69 | 84 | 63 | 82 | 76 | 56 | 79 |
| 3 (U/M) | 19.69 | 0 | 75 | 58 | 78 | 68 | 51 | 72 |

| Catalysts (Example No.) | % by weight | | % EFFECTIVENESS (0.10 ≦ PERIOD ≦ 4.0) | | | | | |
|---|---|---|---|---|---|---|---|---|
| | | | NEW | | | AGED | | |
| | $U_3O_8$ | $CeO_2$ | CO | NOx | HC | CO | NOx | HC |
| 1 (Ce + U)/M | 4.92 | 14.76 | 74 | 67 | 86 | 65 | 58 | 79 |
| 2 (Ce/M) | 0 | 19.69 | 71 | 64 | 81 | 57 | 53 | 73 |
| 3 (U/M) | 19.69 | 0 | 65 | 59 | 79 | 48 | 46 | 70 | from about 0.5% to about 30% of the at least one uranium oxide, and from about 0.2% to about 8% of said at least one metal M.

3. A catalyst of claim 1, wherein the refractory oxide is selected from the group consisting of alpha alumina, beta alumina, delta alumina, theta alumina, gamma alumina, kappa alumina, chi alumina, silica, alumina-silica, zeolites, titanium oxide and mixtures thereof.

4. The catalyst of claim 1, characterized in that the at least one metal M is selected from the group consisting of platinum, rhodium and palladium.

5. The catalyst of claim 1, wherein the substrate is made of ceramic or metallic material.

6. The catalyst of claim 1, wherein the substrate is in monolithic form having a honeycomb structure.

7. The catalyst of claim 1, wherein the porous layer is introduced in a quantity ranging from 20 to 200 g/liter of substrate.

8. A method of preparing the catalyst of claim 1, characterized by the steps of:
a) preparing a mixture of at least one refractory inorganic oxide or a precursor thereof, at least one cerium oxide or a precursor thereof, at least one uranium oxide or a precursor thereof, and a salt of at least one active phase metal M,
b) suspending the mixture in a solution with a pH from about 2 to about 9,
c) coating the substrate with a suspension to obtain the porous layer, and
d) drying and carrying out heat treatment at a temperature below 1000° C.

9. A method of preparing the catalyst of claim 1, characterized by the steps of:
a) preparing a mixture of at least one refractory inorganic oxide or a precursor thereof, at least one cerium oxide or a part of a precursor thereof, and at least one uranium oxide or a part of a precursor thereof and optionally a salt of at least one active phase metal M;
b) suspending the mixture in a solution with a pH from about 2 to about 9;
c) coating the substrate with a suspension to obtain the porous layer;
d) drying and carrying out heat treatment at a temperature below 1000° C.; and
e) carrying out the following two successive stages at least once:
   e1) impregnating onto the porous layer the remainder of the precursors of said cerium and uranium oxides, and optionally the salt of the active phase metal M depending on whether the salt was included at stage a); and
   e2) drying and carrying out heat treatment at a temperature below 1000° C.

10. A method of preparing the catalyst of claim 1, characterized by the steps of:
a) impregnating at least part of at least one refractory inorganic oxide with at least part of at least one salt which is a precursor of the cerium and uranium oxides, and optionally with at least part of at least one salt which is a precursor of the metal M of the catalytically active phase;
b) drying and carrying out heat activation at a temperature below 1000° C.;
c) preparing a mixture of at least part of the refractory inorganic oxide impregnated in step a, optionally at least part of the cerium oxide, optionally at least part of the uranium oxide and optionally or a at least part of at least one salt of the active phase metal M;
d) suspending the mixture in a solution with a pH from about 2 to about 9;
e) coating the substrate with a suspension to obtain the porous layer;
f) drying and carrying out heat treatment at a temperature below 1000° C.; and
g) carrying out the following two successive stages at least once:
   g1) impregnating onto the porous layer the remainder of the salts which are precursors of said cerium and uranium oxides, and either the salt of the active phase metal M or the remainder of that salt optionally included at step a); and
   g2) drying and carrying out heat treatment at a temperature below 1000° C.

11. The method of any of claims 8 and 9, wherein a soft alumina is added to the mixture of step a).

12. The method of claim 10, wherein a soft alumina is added to the mixture of step c).

* * * * *